United States Patent
Nassar et al.

(10) Patent No.: US 11,974,130 B2
(45) Date of Patent: Apr. 30, 2024

(54) METHOD, APPARATUS AND COMPUTER PROGRAM PRODUCT FOR AUTHENTICATION PROCEDURE BETWEEN DEVICES

(71) Applicant: Nokia Technologies Oy, Espoo (FI)

(72) Inventors: Mohamed Amin Nassar, Munich (DE); Bo Holm Bjerrum, Nibe (DK)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 17/569,596

(22) Filed: Jan. 6, 2022

(65) Prior Publication Data

US 2022/0225091 A1     Jul. 14, 2022

(30) Foreign Application Priority Data

Jan. 8, 2021   (FI) .................................. 20215015

(51) Int. Cl.
| | |
|---|---|
| *H04W 12/06* | (2021.01) |
| *H04W 76/14* | (2018.01) |
| *H04W 76/18* | (2018.01) |

(52) U.S. Cl.
CPC ........... *H04W 12/06* (2013.01); *H04W 76/14* (2018.02); *H04W 76/18* (2018.02)

(58) Field of Classification Search
CPC ..... H04W 12/06; H04W 76/18; H04W 12/08; H04W 76/14; G06F 21/30; H04L 9/32
See application file for complete search history.

(56) References Cited

U.S. PATENT DOCUMENTS

| | | | |
|---|---|---|---|
| 11,259,350 B1 * | 2/2022 | Pan ....................... | H04W 88/04 |
| 2016/0286590 A1 | 9/2016 | Cheng et al. | |

(Continued)

FOREIGN PATENT DOCUMENTS

| | | |
|---|---|---|
| WO | 2015/142247 A1 | 9/2015 |
| WO | 2017/027056 A1 | 2/2017 |

OTHER PUBLICATIONS

"3rd Generation Partnership Project; Technical Specification Group Services and System Aspects; Security aspects of 3GPP support for advanced Vehicle-to-Everything (V2X) services (Release 16)", 3GPP TS 33.536, V16.1.0, Sep. 2020, pp. 1-23.

(Continued)

*Primary Examiner* — Esther B. Henderson
(74) *Attorney, Agent, or Firm* — Nokia Technologies Oy

(57) ABSTRACT

There is disclosed methods, apparatuses and computer program products for an authentication procedure in a unicast device to device communication. In accordance with an embodiment the method comprises receiving from an initiating device a request to establish a unicast device to device communication between the initiating device and a target device; sending from the target device an authentication request to the initiating device for authenticating the initiating device; receiving from the initiating device an authentication response to the authentication request including one or more parameters related to the authentication; providing information of the one or more parameters to the application; examining by an application in the target device whether the one or more parameters can be accepted; and if the examining reveals that at least one of the one or more parameters cannot be accepted, sending an authentication failure message to the initiating device.

12 Claims, 6 Drawing Sheets

(56) References Cited

U.S. PATENT DOCUMENTS

2018/0367979 A1* 12/2018 Zhu ..................... H04W 12/068
2020/0100088 A1    3/2020 Kim et al.

OTHER PUBLICATIONS

"3rd Generation Partnership Project; Technical Specification Group Services and System Aspects; Architecture enhancements for 5G System (5GS) to support Vehicle-to-Everything (V2X) services (Release 16)", 3GPP TS 23.287, V16.4.0, Sep. 2020, pp. 1-58.

"3rd Generation Partnership Project; Technical Specification Group Core Network and Terminals; Non-Access-Stratum (NAS) protocol for 5G System (5GS); Stage 3; (Release 17)", 3GPP TS 24.501, V17.0.0, Sep. 2020, pp. 1-729.

"3rd Generation Partnership Project; Technical Specification Group Services and System Aspects; Service requirements for V2X services; Stage 1 (Release 16)", 3GPP TS 22.185, V16.0.0, Jul. 2020, pp. 1-14.

"3rd Generation Partnership Project; Technical Specification Group Services and System Aspects; Proximity-based Services (ProSe); Security aspects (Release 16)", 3GPP TS 33.303, V16.0.0, Jul. 2020, pp. 1-90.

"3rd Generation Partnership Project; Technical Specification Group Services and System Aspects; Study on security aspects of enhancement for proximity based services in the 5G System (5GS) (Release 17)", 3GPP TR 33.847, V0.3.0, Nov. 2020, pp. 1-73.

"Introducing Authentication Failure for PC5 unicast link", 3GPP TSG-CT WG1 Meeting #ABC, C1-20wxyz, Nokia, Dec. 2, 2020, 6 pages.

"Clarifications regarding Authentication procedure for V2X PC5 unicast link", 3GPP TSG SA WG3 Meeting #ABC, S3-20xxxx, Nokia, Dec. 4, 2020, 3 pages.

Office action received for corresponding Finnish Patent Application No. 20215015, dated May 31, 2021, 8 pages.

"3rd Generation Partnership Project; Technical Specification Group Core Network and Terminals; Vehicle-to-Everything (V2X) services in 5G System (5GS); Stage 3 (Release 16)", 3GPP TS 24.587, V16.3.0, Dec. 2020, pp. 1-112.

"Mutual authentication for PC5 unicast link", 3GPP TSG-CT WG1 Meeting #128-e, C1-211271, Nokia, Feb. 25-Mar. 5, 2021, 6 pages.

Extended European Search Report received for corresponding European Patent Application No. 21217894.1, dated Jun. 8, 2022, 10 pages.

"3rd Generation Partnership Project; Technical Specification Group Core Network and Terminals; Vehicle-to-Everything (V2X) services in 5G System (5GS); Stage 3 (Release 17)", 3GPP TS 24.587, V17.0.0, Dec. 2020, pp. 1-113.

"3rd Generation Partnership Project; Technical Specification Group Services and System Aspects; Study on authentication enhancements in 5G System; (Release 17)", 3GPP TR 33.846, V0.9.0, Nov. 2020, pp. 1-40.

"Mutual authentication for PC5 unicast link", 3GPP TSG-CT WG1 Meeting #128-e, C1-211017, Nokia, Feb. 25-Mar. 5, 2021, 4 pages.

International Search Report and Written Opinion received for corresponding Patent Cooperation Treaty Application No. PCT/FI2021/050915, dated Mar. 11, 2022, 16 pages.

"3rd Generation Partnership Project; Technical Specification Group Core Network and Terminals; Proximity-services (ProSe) User Equipment (UE) to ProSe function protocol aspects; Stage 3 (Release 17)", 3GPP TS 24.334, V17.0.0, Dec. 2020, pp. 1-264.

"Mutual authentication for PC5 unicast link", 3GPP TSG-CT WG1 Meeting #128-e, C1-211025, Nokia, Feb. 25-Mar. 5, 2021, 5 pages.

Notice of Allowance received for corresponding European Patent Application No. 21217894.1, dated Jan. 18, 2024, 8 pages.

* cited by examiner

METHOD, APPARATUS AND COMPUTER PROGRAM PRODUCT FOR AUTHENTICATION PROCEDURE BETWEEN DEVICES

TECHNICAL FIELD

The present invention relates to an authentication procedure in a unicast device to device communication, especially in a vehicle to anything communication over PC5 for 5G, system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Vehicle-to-Everything (V2X) communication is a communication to support Vehicle-to-Everything services. V2X services are realized by various types of V2X applications, e.g. Vehicle-to-Vehicle (V2V), Vehicle-to-Pedestrian (V2P), Vehicle-to-Infrastructure (V21) and Vehicle-to-Network (V2N). Generally, the V2X communications can be regarded as a subset of device-to-device (D2D) communication.

SUMMARY

There is provided a method, apparatus and computer program product for an authentication procedure in a unicast device to device communication.

In this disclosure there is provided a mechanism to handle mutual authentication for V2X communication over PC5 for 5G system. In accordance with an embodiment of the disclosure, there is provided a mechanism for a target device (user equipment, UE) to reject a received direct link authentication response back to an initiating device in case an authentication has failed. The Authentication procedure may fail due to being rejected from either of the initiating UE and/or the target UE, for example due to a failure in authenticating that UE, as one of the purposes of the authentication procedure.

The mechanism may comprise that the target UE can reject the received direct link authentication response message and send as a reply a message, which may be called as a direct link authentication failure. This message can be sent from the target UE to the initiating UE, reflecting a failure in the mutual authentication as reported by upper layer of the target UE.

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a method for an authentication procedure in a unicast device to device communication comprising:

receiving by a target device from an initiating device a request to establish a unicast device to device communication between the initiating device and a target device;

sending from the target device an authentication request to the initiating device for authenticating the initiating device;

receiving from the initiating device an authentication response to the authentication request including one or more parameters related to the authentication;

providing information of the one or more parameters to an application in the target device;

examining by the application whether the one or more parameters can be accepted; and if the examining reveals that at least one of the one or more parameters cannot be accepted, sending an authentication failure message to the initiating device.

According to a second aspect there is provided an apparatus, comprising means for:

receiving from an initiating device a request to establish a unicast device to device communication between the initiating device and the apparatus;

sending an authentication request to the initiating device for authenticating the initiating device;

receiving from the initiating device an authentication response to the authentication request including one or more parameters related to the authentication;

providing information of the one or more parameters to an application in the apparatus;

examining by the application whether the one or more parameters can be accepted; and if the examining reveals that at least one of the one or more parameters cannot be accepted, sending an authentication failure message to the initiating device.

According to a third aspect there is provided an apparatus comprising at least one processor; and at least one memory including computer program code; the at least one memory and the computer program code configured to, with the at least one processor, to cause the apparatus to:

receive from an initiating device a request to establish a unicast device to device communication between the initiating device and the apparatus;

send an authentication request to the initiating device for authenticating the initiating device;

receive from the initiating device an authentication response to the authentication request including one or more parameters related to the authentication;

provide information of the one or more parameters to an application in the apparatus;

examine by the application whether the one or more parameters can be accepted; and send an authentication failure message to the initiating device, if the examining reveals that at least one of the one or more parameters cannot be accepted.

According to a fourth aspect there is provided an apparatus, comprising:

a first circuitry configured to receive from an initiating device a request to establish a unicast device to device communication between the initiating device and the apparatus;

a second circuitry configured to send an authentication request to the initiating device for authenticating the initiating device;

a third circuitry configured to receive from the initiating device an authentication response to the authentication request including one or more parameters related to the authentication;

a fourth circuitry configured to provide information of the one or more parameters to an application in the apparatus; and a fifth circuitry configured to examine by the application whether the one or more parameters can be accepted;

wherein the second circuitry is further configured to send an authentication failure message to the initiating device, if the examining reveals that at least one of the one or more parameters cannot be accepted.

According to a fifth aspect there is provided a computer program product comprising computer readable program code configured to, with at least one processor, cause an apparatus. to perform at least the following:

receive from an initiating device a request to establish a unicast device to device communication between the initiating device and the apparatus;

send an authentication request to the initiating device for authenticating the initiating device;

receive from the initiating device an authentication response to the authentication request including one or more parameters related to the authentication;

provide information of the one or more parameters to an application in the apparatus;

examine by the application whether the one or more parameters can be accepted; and send an authentication failure message to the initiating device, if the examining reveals that at least one of the one or more parameters cannot be accepted.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
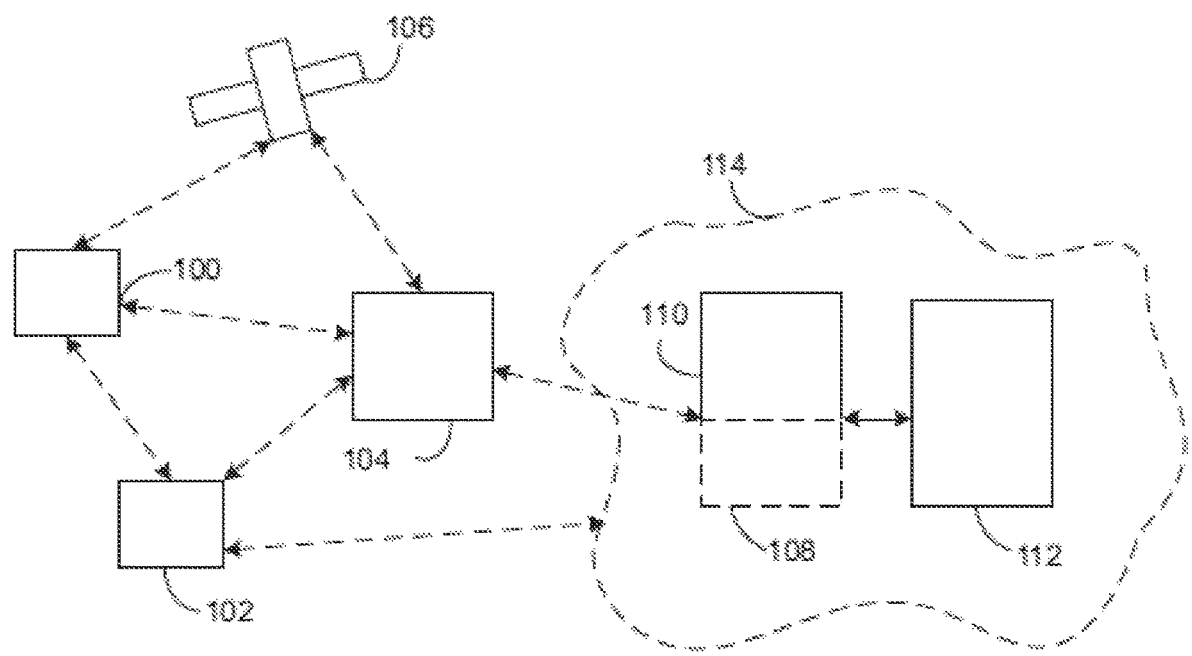
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following the vehicle-to-everything communication is used as an example of the device-to-device communication. There exist at least two modes of operation for V2X communication, namely V2X communication over a PC5 reference point and V2X communication over a Uu reference point. These two operation modes may be used by a UE independently for transmission and reception. PC5 is the reference point between the UEs, and it includes the LTE based PC5 and/or NR based PC5. Uu is the reference point between the UE and the NG-RAN.

The term PC5 refers to a reference point in which a UE can directly communicate with another UE over a direct channel between the UEs, without any base stations in between. In system architectural level, a proximity service (ProSe) is a feature that specifies the architecture of the direct communication between UEs. In 3GPP RAN specifications, the term "sidelink" is used when referring to the direct communication over PC5.

3GPP ($3^{rd}$ Generation Partnership Project) has been developing standards for sidelink (SL) as a tool for direct communication between user equipment (UE to UE communication) in various use cases. In some use cases solutions including new radio (NR) sidelink are being specified mainly for vehicle-to-everything (V2X) while they can also be used for public safety when the service requirement can be met.

V2X communication over NR based PC5 reference point supports broadcast mode, groupcast mode, and unicast mode.

A PC5 unicast link between two UEs allows V2X communication between one or more pairs of peer V2X services in these UEs. One PC5 unicast link supports one or more V2X service types. To perform unicast mode of V2X communication over PC5 reference point, a Layer-2 link shall be established between the two peer UEs. The initiating UE (UE-1) sends a direct link establishment request message to initiate the unicast layer-2 link establishment procedure to the target UE (UE-2). After that authentication and security procedures are performed and relevant authentication and security messages are exchanged between the initiating UE and the target UE. In a successful scenario, a direct link establishment accept message is sent to the initiating UE by target UE to indicate that the target UE has successfully established security with the initiating UE.

The PC5 unicast link Authentication procedure (also known as: Direct Auth and Key Establish procedure) can be triggered during the PC5 unicast link Establishment procedure or the PC5 unicast link re-keying procedure and it has two purposes:

1) To perform mutual authentication of UEs that are establishing a PC5 unicast link and
2) To derive a new shared key for encryption, which may be called as a $K_{NRP}$. This key shall be shared between two UEs during a PC5 unicast link establishment procedure or a PC5 unicast link re-keying procedure.

After successful completion of the PC5 unicast link authentication procedure, the new $K_{NRP}$ key is used for security establishment during the PC5 unicast link security mode control procedure.

The $K_{NRP}$ key is a 256-bit root key that is shared between the two entities that are communicating using NR PC5 unicast link. It may be refreshed by re-running the authentication signalling using long-term credentials. In order to generate a $K_{NRP}$-sess (the next layer of keys), nonces are exchanged between the UEs. $K_{NRP}$ may be kept even when the UEs have no active unicast communication session between them. The $K_{NRP}$ ID is used to identify the $K_{NRP}$ key.

The mutual authentication part happens at the upper layers of the two UEs using the information exchanged in an information element (IE) which may be called as a Key establishment information container IE (also known as Key_Est_Info container) within the authentication procedure. In accordance with an embodiment of the disclosure, a V2X layer at the two peer UEs provide the Authentication framework (messaging signals, corresponding containers IEs, etc.) for the mutual authentication to be performed at upper layers of the communication protocol stack of the UEs.

A radio device may be a device configured for communications on radio waves over a wireless radio link, i.e. a wireless link. The communications may comprise user traffic and/or signaling. The user traffic may comprise data, voice, video and/or audio. Examples of the wireless link comprise a point-to-point wireless link and a point-to-multipoint wireless link. The wireless link may be provided between two radio devices. It should be appreciated that the radio devices may have differences. For example, radio devices connected by a wireless link may comprise one or more of a user equipment (UE), an access node, an access point, a relay node, a user terminal and an Internet of Things (IoT) device.

A radio device may be a radio access device that is configured to serve a plurality of other radio devices, user radio devices, and give radio access to a communications system for the user radio devices. A radio device may also be a radio station serving as relay node or providing a wireless backhaul for one or more radio access nodes. Examples of the radio access devices comprise at least an access node, an access point, a base station and an (e/g)NodeB. Examples of the user radio devices comprise at least a user terminal and user equipment (UE). The radio device may be an aerial radio device and/or an extraterrestrial radio device configured to operate above the ground without a fixed installation to a specific altitude. Examples of extraterrestrial radio devices comprise at least satellites and spacecraft that are configured for radio communications in a communications system that may comprise both terrestrial and extraterrestrial radio devices. Examples of aerial radio devices comprise at least High Altitude Platform Stations (HAPSs) and unmanned aerial vehicles (UAVs), such as drones. The radio access device may have one or more cells which the user radio devices may connect to in order to access the services of the communications system via the radio access device. The cells may comprise different sizes of cells, for example macro cells, micro cells, pico cells and femto cells. A macro cell may be a cell that is configured to provide coverage over a large coverage area in a service area of the communications system, for example in rural areas or along highways. A micro cell may be a cell that is configured to provide coverage over a smaller coverage area than the macro cell, for example in a densely populated urban area. Pico cells may be cells that are configured to provide coverage over a smaller area than the micro cells, for example in a large office, a mall or a train station. Femto cells may be cells that are configured to provide coverage over a smaller area than the femto cells, for example at homes or small offices. For example, macro cells provide coverage for user radio devices passing a city on a motorway/highway and local cells, e.g. micro cells or smaller cells, provide coverage for user radio devices within the city. In another example, macro cells provide coverage for aerial radio devices and/or extraterrestrial radio devices and local cells, e.g. micro cells or smaller cells, provide coverage for the aerial radio devices and/or extraterrestrial radio devices that are located at elevated positions with respect to one or more radio access devices of the communications system. Accordingly, an aerial radio device or extraterrestrial radio device may be connected to a micro cell of a radio access device and when the aerial radio device or extraterrestrial radio device is above a certain height from the ground, the aerial radio device or extraterrestrial radio device may be switched to a macro cell, for example by a handover procedure.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access node, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Figure 5A:
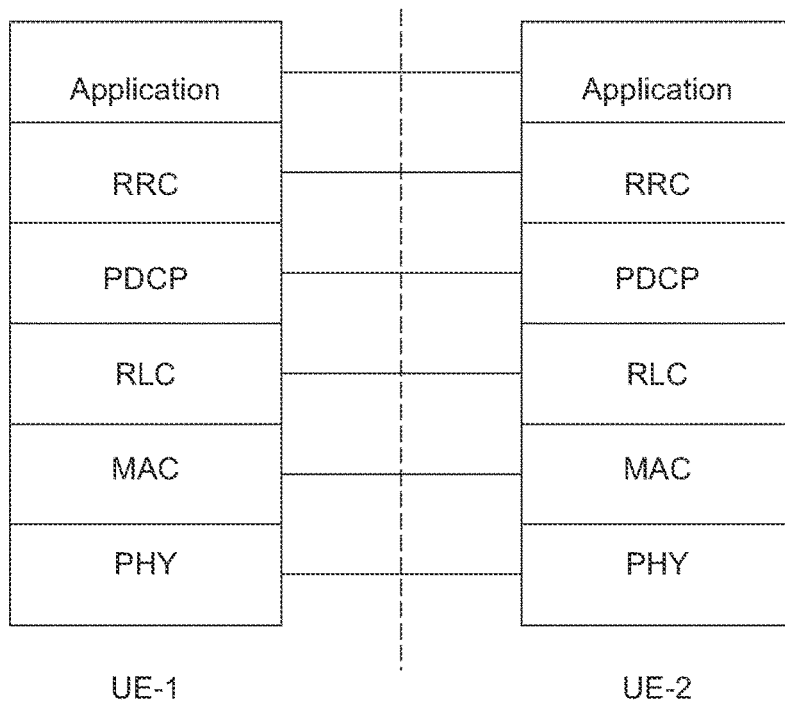
FIG. 5a illustrates an example of a control plane protocol stack.
Figure 5B:
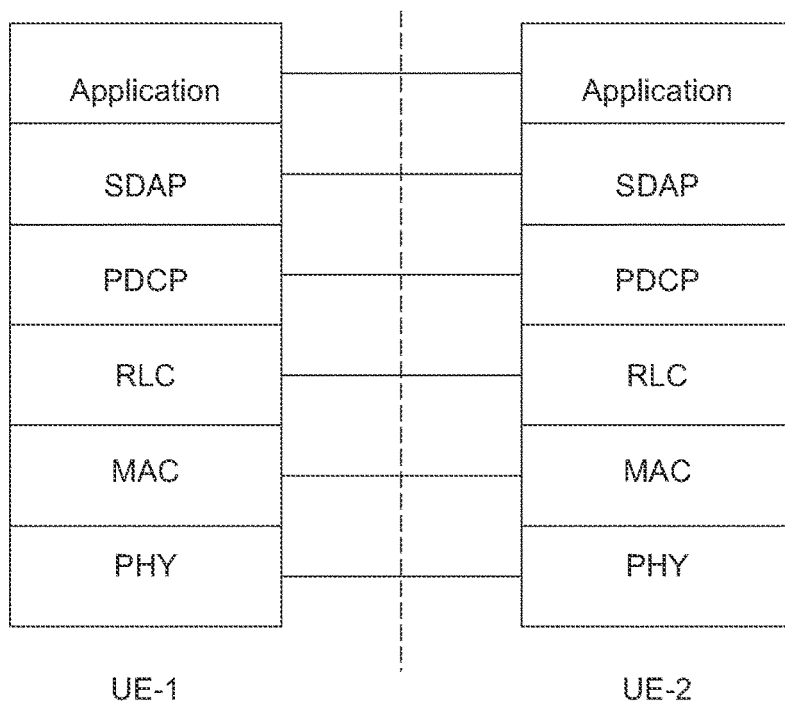
FIG. 5b illustrates an example of a user plane protocol stack.

FIG. 5a illustrates an example of a PC5 control plane (PC5-C) protocol stack and signalling between layers of the protocol stack of two UEs, and FIG. 5b illustrates an example of a PC5 user plane (PC5-U) protocol stack and signalling between layers of the protocol stack of two UEs. The lowest layer is the physical layer by which the actual signalling (transmission/reception of messages) takes place. The next layer above the physical layer is the media access control layer (MAC), which is concerned with channel management. The next layer is the radio link control layer (RLC), which is responsible for transfer of upper layer packet data units (PDUs). The next layer, packet data convergence control layer (PDCP), is responsible for inter alia header compression and decompression of IP data, transfer of data (user plane or control plane), etc. The layer above the PDCP layer is the radio resource control (RRC) layer in the control place protocol stack and the service data adaptation protocol (SDAP) layer in the user plane protocol stack. The RRC layer is responsible of e.g. connection establishment, connection release and connection reconfiguration. The SDAP layer is responsible of e.g. mapping between a quality of service (QoS) flow and a data radio bearer.

The highest layer in these examples is the application layer in which applications utilizing the direct link may be executed. Hence, the determination whether an authentication response from the target UE can be accepted or needs to be rejected by the initiating UE may be performed at the application layer unless some lower layer already detects that the authentication should be rejected. As an example, the direct link to be established by the UEs. may fulfill requirements of the physical layer and the media access control layer but do not fulfill some requirements of the initiating application.

It should be noted, however, that the protocol stacks of FIGS. 5a and 5b are only examples and in practical implementations the protocol stacks may be different from them.

Figure 3A:
FIG. 3a describes an example signalling diagram of a direct link authentication procedure between UEs when no acknowledgment is transmitted by the initiating UE to the target UE after reception of the direct link authentication response from the target UE.
Figure 3B:
FIG. 3b describes an example signalling diagram of a direct link authentication procedure between UEs when the target UE rejects the authentication request from the initiating UE.

FIGS. 3a and 3b describe the PC5 unicast link authentication procedure and the messages exchanged between the two UEs for that procedure when no acknowledgment is transmitted by the initiating UE to the target UE after reception of the direct link authentication response from the target UE. In the example of FIG. 3a the target UE responds by sending a positive acknowledgment Direct Link Authentication Response back to the initiating UE and in the example of FIG. 3b the target UE responds by sending a negative acknowledgment Direct Link Authentication Reject back to the initiating UE.

It is noted that in FIGS. 3a and 3b the initiating UE corresponds to UE-2 and target UE corresponds to UE-1 from the description mentioned above.

It is worth to note that the authentication request and authentication response messages may be exchanged multiple times between the two UEs, depending on the authentication method used at upper layers, until an authentication agreement is achieved between the two UEs.

If the initiating UE does not indicate an authentication failure to the target UE, this may give a wrong understanding that the authentication will always succeed and can't be rejected by the initiating UE.

An example case where the upper layers at the initiating UE want to reject the key establishment information container (Key_Est_Info) received from the target UE in the direct link authentication response, is that the upper layer(s) of the initiating UE fails to validate one or more of the authentication parameters provided in the received key establishment information container. This comes from the fact that the initiating UE is in a need to authenticate the target UE by checking the parameters in the received response message and comparing the received authentication token with a locally generated token, otherwise the mutual authentication wouldn't be achieved.

An example scenario is described in FIG. 4a and is discussed below in more detail.

In the first step 300, the initiating UE has started the PC5 unicast link establishment procedure by sending a DIRECT LINK ESTABLISHMENT REQUEST message to the target UE in order to perform mutual direct link establishment procedure including authentication and security keys derivation. In the next step 301, the target UE has started the PC5 unicast link authentication procedure by sending a DIRECT LINK AUTHENTICATION REQUEST message to the initiating UE in order to perform mutual authentication and start security keys derivation. This message may include security capabilities of the target UE (e.g. a list of algorithms that the target UE will accept for this connection) and a signalling security policy of the target UE. The target UE may also include Nonce_1 (for session key $K_{NRP}$-sess generation), and the most significant 8-bits of a $K_{NRP}$-sess ID in this message if the signalling integrity protection policy of the target UE is either "REQUIRED" or "PREFERRED". The most significant 8-bits of the $K_{NRP}$-sess ID may be chosen such that the target UE will be able to locally identify a security context that is created by this procedure. The message may also include a $K_{NRP}$ ID if the target UE has an existing $K_{NRP}$ for the UE that it is trying to communicate with i.e. the initiating UE. The absence of the $K_{NRP}$ ID parameter indicates that the target UE does not have a $K_{NRP}$ for the initiating UE. The message may also contain Key_Est_Info.

In the second step 302, the V2X layer at the initiating UE forwards the received Key_Est_Info container to the upper layer(s). The upper layer(s) at the initiating UE uses the information in the received container Key_Est_Info together with available long term credentials (such as public/private key pair depending on the particular use case) to calculate an authentication token(s) and derive the shared key $K_{NRP}$.

In the third step 303 the upper layers at the initiating UE forward the calculated authentication token(s) plus any required security parameters to the V2X layer within a new container Key_Est_Info. The initiating UE forms the DIRECT LINK AUTHENTICATION RESPONSE message and sends it to the target UE, including the container Key_Est_Info.

In the fourth step 304 the target UE, upon reception of DIRECT LINK AUTHENTICATION RESPONSE, forwards the received Key_Est_Info container to upper layers in order to be used together with the available credentials for calculating the shared key $K_{NRP}$. Also, in order to achieve the mutual authentication, the target UE calculates its local version of the authentication token(s) and then compares that/them with the values received in the authentication response.

In the fifth step 305 the steps 301, 302, 303 and 304 can optionally be repeated multiple times, depending on the used application method at upper layers, till the full mutual authentication is achieved.

If the Direct Auth and Key Establish procedure described above is successful and not rejected by either of the two UEs, the initiating UE may send a Direct Security Mode Command message to the target UE. This message may only contain the MSB of $K_{NRP}$ ID unless a Null integrity algorithm is selected by the initiating UE and optionally Key_Est_Info if a fresh $K_{NRP}$ is to be generated. The initiating UE may include a Chosen_algs parameter to include the selected integrity and confidentiality algorithm. Non-Null security algorithm in the Chosen_algs indicates the corresponding security protection is activated and the security algorithm the UEs will use to protect the data in the message. Null security algorithm in the Chosen_algs indicates the corresponding security protection is unprotected. The Chosen_algs may only indicate the use of the NULL integrity algorithm if UE_2's signalling integrity security policy is either NOT NEEDED or PREFERRED. The initiating UE may also return the target UE's security capabilities and the target UE's signalling security policy to provide protection against bidding down attacks. In the case that the NULL integrity algorithm is chosen, the NULL confidentiality algorithm shall also be chosen and the initiating UE shall set the Kr P-sess ID of this security context to the all zero value.

In the sixth step 306 it is assumed that the comparison of the authentication token fails at the target UE i.e. the authentication token is not valid (e.g. the initiating UE is not authenticated to establish a connection with the target UE), then if no indication of the failure were transmitted by the target UE to the initiating UE the procedure enters in an undefined state, because the target UE will neither be able to indicate the failure to initiating UE nor be able to start the security mode procedure which follows the authentication procedure. Hence both UEs enter an undefined situation and the same for the parent procedure (Direct Link Establishment) which triggered the authentication.

As can be seen in the message sequence diagram in FIG. 3a, the current stage-3 specification 3GPP TS 24.587 provided a mechanism for the initiating UE to validate the parameters of the DIRECT LINK AUTHENTICATION REQUEST message received from the target UE and the possibility to reject this request message by sending DIRECT LINK AUTHENTICATION REJECT message. The details of this procedure can be found in 3GPP TS 24.587 in subclause 6.1.2.6.5. A typical case for triggering this rejection is when the received parameters within Key_Est_Info fails in the validation step at the initiating UE.

However, this rejection may not be sufficient to reflect the failure of the complete authentication procedure, i.e. the case when the target UE doesn't accept the authentication token(s) received from the initiating UE in the DIRECT LINK AUTHENTICATION RESPONSE message.

The embodiments are not, however, restricted to the system given as an example but a person skilled in the art may apply the solution to other communication systems provided with necessary properties. For example, the embodiments may also be implemented in proximity based services (ProSe).

Some features of such proximity based services comprise ProSe discovery (direct or EPC-level) and ProSe Direct Communication. ProSe discovery identifies that ProSe-enabled UEs are in proximity, using E-UTRAN (with or without E-UTRAN), WLAN technology or EPC. ProSe Direct Communication enables establishment of communication paths between two or more ProSe-enabled UEs that are in direct communication range. The ProSe Direct Communication path could use E-UTRAN or WLAN. For Public Safety specific usage, ProSe-enabled Public Safety UEs can establish the communication path directly between two or more ProSe-enabled Public Safety UEs, regardless of whether the ProSe-enabled Public Safety UE is served by E-UTRAN. ProSe Direct Communication is also facilitated by the use of a ProSe UE-to-Network Relay, which acts as a relay between E-UTRAN and UEs.

Figure 4A:
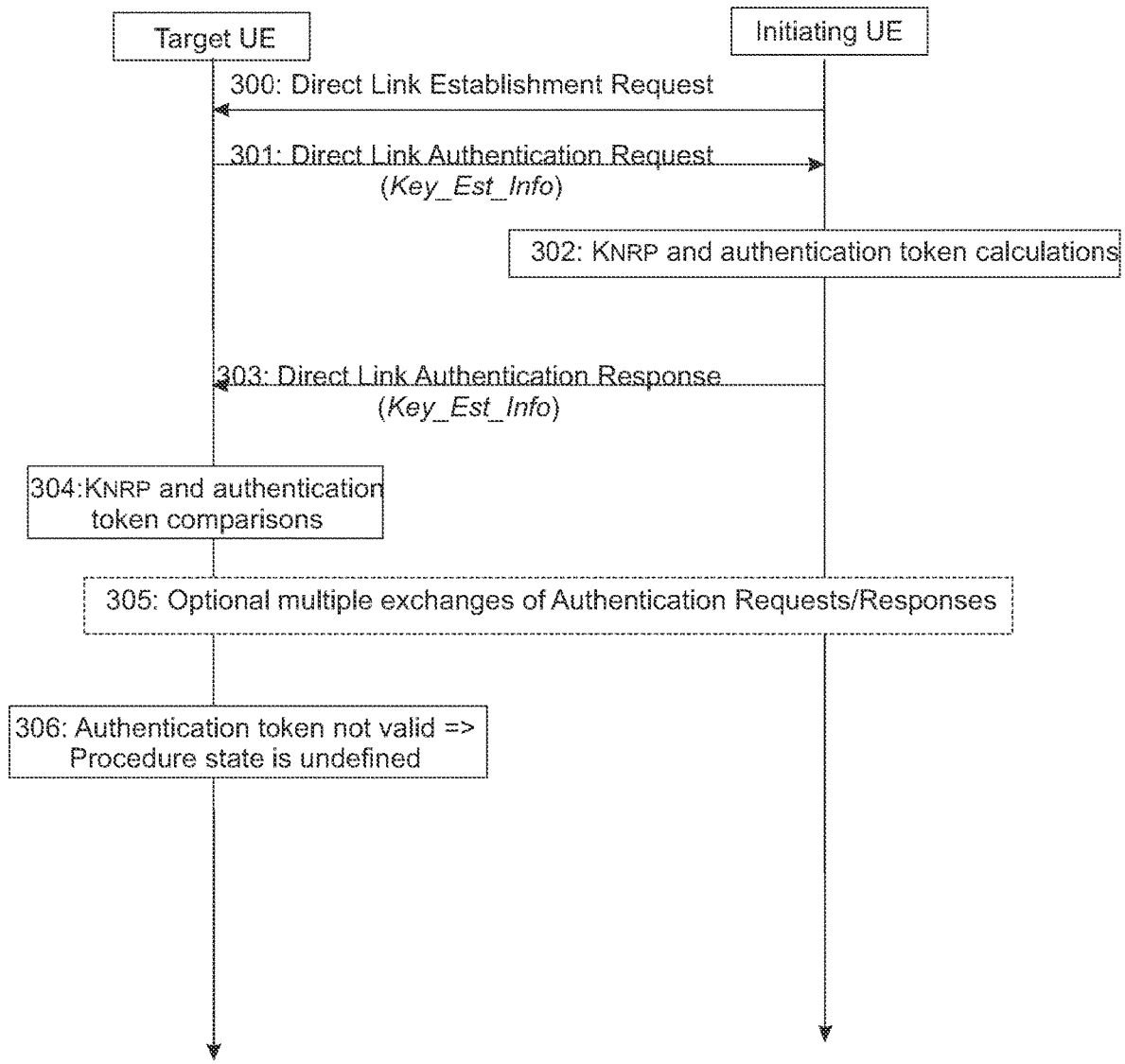
FIG. 4a describes an example signalling diagram of a direct link authentication procedure between UEs when no acknowledgment is transmitted by the initiating UE although the initiating UE rejects the authentication response from the target UE.
Figure 4B:
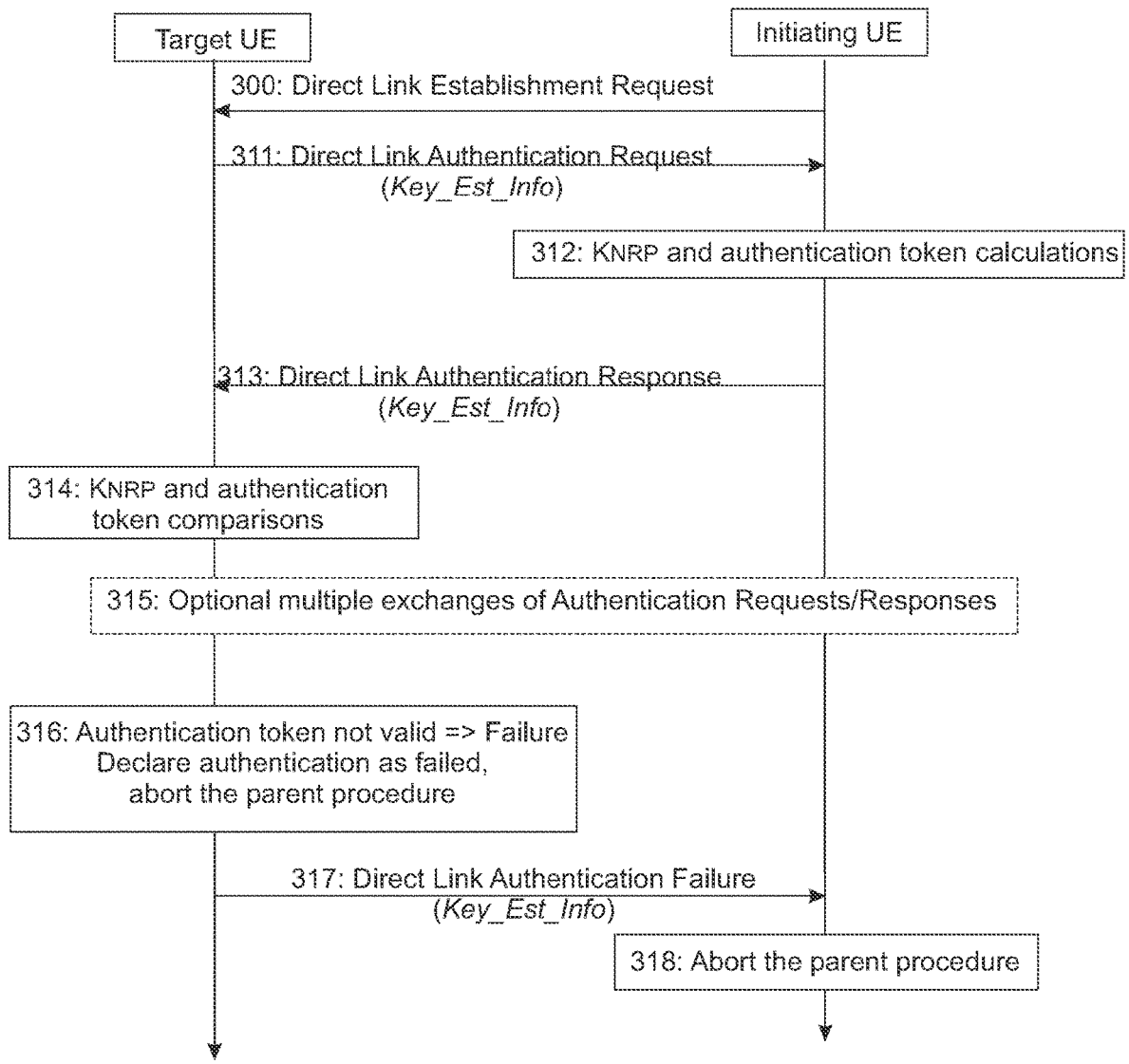
FIG. 4b describes an example signalling diagram of a direct link authentication procedure between UEs when a negative acknowledgment is transmitted by the initiating UE when the initiating UE rejects the authentication response from the target UE.

FIG. 4b illustrates a signalling diagram according to a method in which the target UE can inform the initiating UE that it shall not authenticate the unicast link based on the parameters received from the initiating UE.

Steps 311 to 315 in FIG. 4b correspond with the steps 301 to 305 of FIG. 4a, respectively.

In step 316 it is assumed that the comparison of the authentication token fails at target UE i.e. the authentication token is not valid. Hence, the target UE would declare the authentication procedure as failed and aborts the parent procedure that triggered the PC5 unicast link authentication procedure (e.g. the Direct Link Establishment procedure or the re-keying procedure).

In step 317 the target UE triggers the generation of a DIRECT LINK AUTHENTICATION FAILURE message and pass this message to the lower layers of the protocol stack for transmission along with the target UE's layer-2 ID for unicast communication and the initiating UE's layer-2 ID for unicast communication. The message is transmitted towards the initiating UE which informs the initiating UE that authentication has failed. The DIRECT LINK AUTHENTICATION FAILURE message can optionally deliver a container Key_Est_Info to the initiating UE which could carry some information about the failure type and related parameters, depending on the authentication method used by upper layers. This may be useful for upper layer to take any needed decision in next authentication cycles.

In step 318, upon reception of the DIRECT LINK AUTHENTICATION FAILURE, the initiating UE aborts the parent procedure that triggered the authentication procedure (e.g. the Direct Link Establishment procedure or the re-keying procedure) and optionally delivers the Key_Est_Info to upper layers.

In accordance with an embodiment of the disclosure, the direct link authentication failure message definition is as follows:

Message type: DIRECT LINK AUTHENTICATION FAILURE
Significance: dual
Direction: UE to peer UE

| IEI | Information Element | Type/ Reference | Presence | Format | Length |
|---|---|---|---|---|---|
| | DIRECT LINK AUTHENTICATION FAILURE message identity | PC5 signalling message type 8.4.1. | M | V | 1 |
| | Sequence number | Sequence number 8.4.2 | M | V | 1 |
| | Key establishment information container | Key establishment information container 8.4.12 | O | TLV-E | 4-n |

The above described embodiments may improve the operation of user equipment when two user equipment are trying to establish a direct link between them but for some reason the initiating UE cannot accept some or all of the properties of the direct link provided by the initiating UE, wherein the target UE is able to report the initiating UE that the establishment of the direct link has failed.

The embodiments of the disclosure provide a mutual authentication procedure as a purpose for the Authentication procedure for V2X communication over PC5 for 5G system. Before the invention there was no requirement how mutual authentication is achieved.

The embodiments of the disclosure provide both initiating UE and target UE a way to abort the parent procedure that triggered the authentication in case of authentication failure.

Some embodiments of the disclosure enable the target UE to optionally report the authentication failure reason to the initiating UE by including the optional container Key_Est_Info in the DIRECT LINK AUTHENTICATION FAILURE message.

Figure 2:
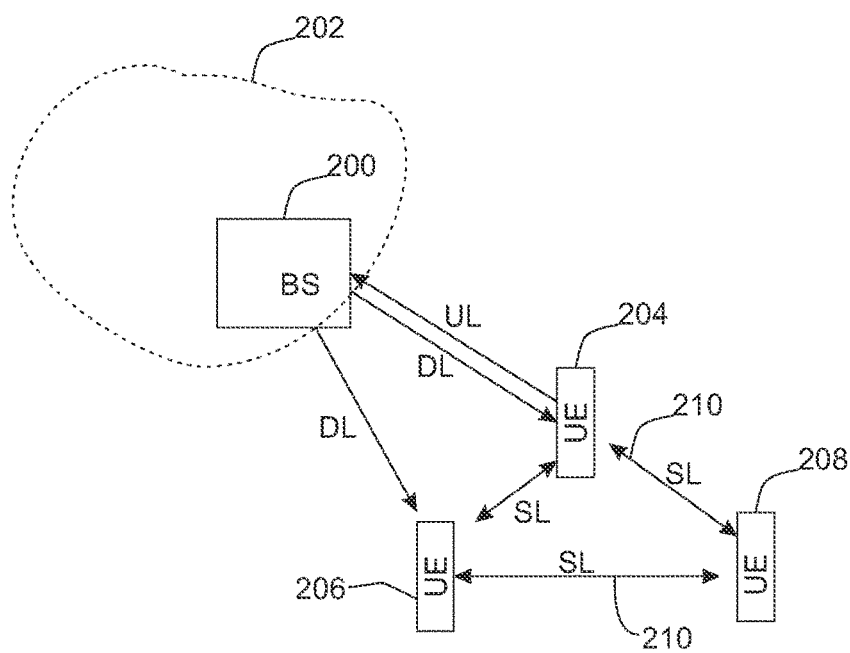
FIG. 2 illustrates an example of a communication setup in which some embodiments may be implemented.

FIG. 2 illustrates an example of a communication setup in which some embodiments may be implemented. There is a base station 200 which may operate as an access point to a communication network 202 by user devices 204, 206, 208. The user devices 204, 206, 208 have wireless communication capability with other user devices and/or the base station. In the setup of FIG. 2 one user device 204 is acting as a relay between some other user devices 206, 208 and the base station 200, for example. However, some of the user devices 204, 206, 208 may also be able to have a direct, mutual communication connection without any relaying user device or the base station. In the example of FIG. 2 the second user device 206 and the third user device 208 are communicating with each other whereas the first user device 204 is communicating with the base station 200, the second user device 206 and the third user device 208.

User devices having direct connection with each other may use a sidelink connection 210, for example.

In the illustration of FIG. 2, the user device 204 is communicating with the base station 200 by using both a downlink (DL) and uplink (UL) whereas the user device 206 is communicating with the base station 200 by using only the downlink (DL) i.e. is only receiving signals from the base station 200 and communicates with two other user devices 204, 208 via the sidelink. The user device 208 is communicating with the user devices 204 and 206 via the sidelink only, but the user device 204 which is able to communicate with the base station 200 may forward messages from the other user devices 206, 208 to the base station 200 and may forward messages from the base station 200 to the other user devices 206, 208.

It may also be possible that a user device is able to receive signals from a base station, but signals transmitted by that user device may not be received by the base station. This may be due to higher transmission power available by the base station than the transmission power of the user device. In this kind of situation, the user device may receive e.g. control information from the base station (via downlink, DL) and transmit replies and data to a relaying user device utilizing sidelink communication with the relaying user device, for example.

In the following, some examples embodiments will be described with reference to the flow diagram of FIG. 4, the signaling diagrams of FIGS. 5a and 5b for interactions between user equipment over sidelink and between user equipment and a serving network, and the system setup of FIG. 2.

Figure 6:
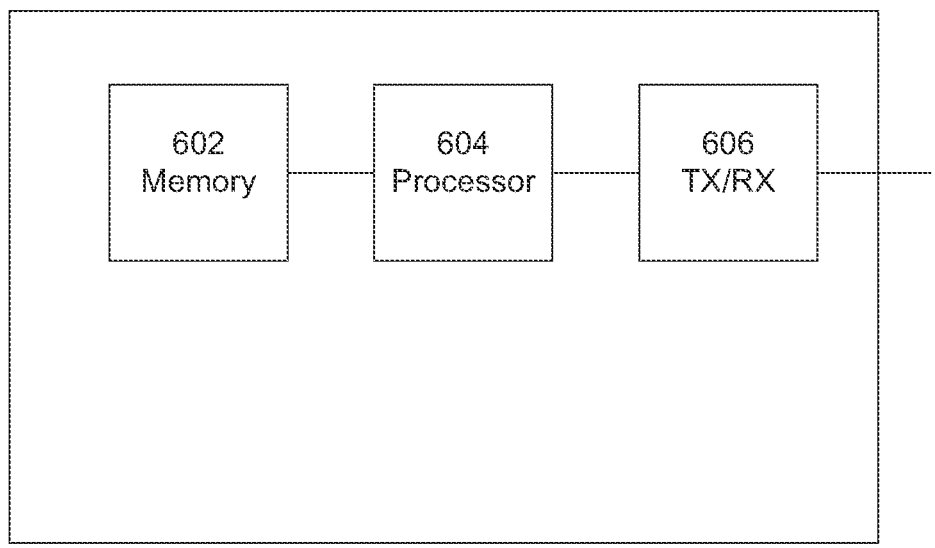
FIG. 6 illustrates an apparatus in accordance with an embodiment.

FIG. 6 illustrates an example of an apparatus in accordance with at least some embodiments of the present invention. The apparatus may be a radio device, for example a radio access node or a user radio device. The apparatus may perform one or more functionalities according to examples described herein.

The apparatus comprises a processor 602 and a transceiver 604. The processor is operatively connected to the transceiver for controlling the transceiver. The apparatus may comprise a memory 606. The memory may be operatively connected to the processor. It should be appreciated that the memory may be a separate memory or included to the processor and/or the transceiver.

According to an embodiment, the processor is configured to control the transceiver to perform one or more functionalities described according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a user radio device, UE, radio access device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a radio station, in a user radio device, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method, comprising:
    receiving from a target device a request to establish a unicast device to device communication between the target device and an initiating device;
    sending from the initiating device an authentication request to the target device for authenticating the target device;
    receiving from the target device an authentication response to the authentication request including one or more parameters related to the authentication;
    providing information of the one or more parameters to an application in the initiating device;
    examining by the application whether the one or more parameters can be accepted; and
    if the examining reveals that at least one of the one or more parameters cannot be accepted, sending an authentication failure message to the target device.

2. The method according to claim 1, comprising:
    including in the authentication request information about security capabilities and a signalling security policy of the initiating device.

3. The method according to claim 1, wherein the one or more parameters related to the authentication comprises at least one or more authentication tokens.

4. The method according to claim 3, wherein the examining comprises:
    comparing the received one or more authentication tokens with one or more local authentication tokens of the initiating device; and
    on the basis of the comparison determining whether the one or more parameters can be accepted.

5. The method according to claim 1 further comprising:
    including in the authentication failure message information about at least one reason for the authentication failure.

6. The method according to claim 1 further comprising:
    forming the authentication request based on the request to establish the unicast device to device communication.

7. An apparatus comprising at least one processor; and at least one memory including computer program code; the at least one memory and the computer program code configured to, with the at least one processor, to cause the apparatus to:
    receive from an application of a target device a request to establish a unicast device to device communication between the target device and the apparatus;
    send an authentication request to the target device for authenticating the target device;
    receive from the target device an authentication response to the authentication request including one or more parameters related to the authentication;
    provide information of the one or more parameters to an application in the apparatus;
    examine by the application whether the one or more parameters can be accepted; and if the examining reveals that at least one of the one or more parameters cannot be accepted, send an authentication failure message to the target device.

8. The apparatus according to claim 7, wherein the at least one memory and the computer program code are further configured to, with the at least one processor, to cause the apparatus to:

include in the authentication request information about security capabilities and a signalling security policy of apparatus.

9. The apparatus according to claim 7, wherein the one or more parameters related to the authentication comprises at least one or more authentication tokens.

10. The apparatus according to claim 7, wherein the at least one memory and the computer program code are further configured to, with the at least one processor, to cause the apparatus to:

compare the received one or more authentication tokens with one or more local authentication tokens of the apparatus; and on the basis of the comparison determine whether the one or more parameters can be accepted.

11. The apparatus according to claim 7, wherein the at least one memory and the computer program code are further configured to, with the at least one processor, to cause the apparatus to:

include in the authentication failure message information about at least one reason for the authentication failure.

12. The apparatus according to claim 7, wherein the at least one memory and the computer program code are further configured to, with the at least one processor, to cause the apparatus to: further comprising means for:

form the authentication request based on the request to establish the unicast device to device communication.

\* \* \* \* \*